Dec. 6, 1955 R. THEILE 2,726,351

TELEVISION PICK-UP TUBES

Filed July 16, 1953

Inventor
Richard Theile
By Holcombe, Wetherill & Brisebois
Attorneys

United States Patent Office 2,726,351

Patented Dec. 6, 1955

2,726,351

TELEVISION PICK-UP TUBES

Richard Theile, Marburg (Lahn), Germany, assignor to Pye Limited, Cambridge, England, a British company Application July 16, 1953, Serial No. 368,255

Claims priority, application Great Britain July 16, 1952

10 Claims. (Cl. 315—9)

The present invention relates to television pick-up tubes, and more particularly to pick-up tubes with high velocity scanning, such as tubes known as iconoscopes and image iconoscopes.

In these types of pick-up tubes, the angle of incidence between the scanning beam from the gun and the target electrode changes as the beam moves across the target electrode, which means that the current density of the exploring electron beam varies across the surface of the target electrode due to changes in the cross-sectional area of the beam impinging thereon.

This change in cross-sectional area of the beam where it impinges on the target produces gaps of varying size between adjacent lines. For instance, in any one scanning line, the cross-section of the beam at the mid-point of the line will be smaller than at either end of the line where the beam meets the target electrode at a more oblique angle. Thus any one line will tend to be narrower in the centre than at either end, giving rise to elliptical shaped gaps between successive lines. These gaps will further vary in width in a frame direction due to the changing angle of incidence between the scanning beam and the targe electrode at each successive line of a scanning raster.

The changes of current density and spot size during the scanning of a complete raster as above explained, produces spurious signals, known as "horseshoe effect," which show the geometrical pattern of constant current densities over the surface of the target electrode.

The present invention has for an object to provide an arrangement for reducing or avoiding the "horseshoe effect."

According to one aspect of the invention, the electron gun is caused to produce an electron beam forming a spot on the target surface, which spot is small compared with the line pitch, and the electron beam is oscillated in a direction transverse to the line direction at a frequency which is high in relation to the line frequency, the amplitude of oscillation of the beam being varied in a manner to at least partially compensate for the horseshoe effect.

According to another aspect of the invention, the electron beam is adapted to form a spot, on the target surface of the pick-up tube, which spot is small compared with the line pitch, and the electron beam is oscillated in a direction transverse to the line direction at a frequency which is high in relation to the line frequency, the amplitude of the oscillations being varied along the length of each line and in successive lines of each frame or raster in such a manner that the width of each individual line and of the lines in each frame or raster remains substantially constant.

The amplitude of the high frequency oscillations applied to the spot can be varied by modulating a high frequency oscillation applied to the electron beam with waveforms derived from the line and frame deflecting waveform generators.

These modulation waveforms are applied to the higher frequency which oscillates the spot in such a manner that the spot amplitude varies in a manner to maintain the line width substantially constant. Thus, if the spot is of smallest size at the middle of a scanning line, the gap between that line and an adjacent line, would normally be greatest at this point, and therefore, according to the invention, the component of the modulation waveform derived from the line deflecting waveform generator is arranged to increase the amplitude of oscillation of the spot by the greatest amount at this point in each line. Similarly the component of the modulation waveform derived from the deflecting waveform generator at frame frequency is superimposed on the higher frequency in such a manner that the spot is oscillated with increased amplitude by this component of the modulation waveform over those lines in each raster where the cross-sectional area of the scanning beam is smallest, in relation to the other lines of the raster in the frame direction.

Preferably, the waveforms derived from the line and frame deflecting waveform generators are combined with the source of high frequency signals which oscillates the electron beam so as to produce modulated oscillations which may be applied to the electron beam in any suitable manner.

However, the modulation waveform which is required accurately to compensate for the horseshoe effects produced on the target electrode is of a complex nature, and the present invention further provides an arrangement wherein the waveform for varying the amplitude of the high frequency oscillation applied to the spot is derived from a copy of the pattern of the horseshoe effect produced on the target electrode of the pick-up tube. Since the pattern of the horseshoe effect produced on any one tube remains substantially unaltered, a geometrical reproduction of the pattern can be easily made.

According to a further feature of the invention, therefore, a geometrical reproduction of the charge pattern producing the horseshoe effect on a pick-up tube is traversed by a scanning beam of which the line and frame deflecting waveforms are in synchronism with the line and frame deflecting waveforms of the pick-up tube, so as to produce a signal modulated according to the pattern of the horseshoe effect, which signal is applied to vary the amplitude of oscillation of a wave having a frequency which is high in relation to the line frequency, said oscillations being applied to oscillate the electron beam in a direction transverse to the line direction and thereby substantially compensate for the horseshoe effect produced on the tube. The geometrical reproduction of the horseshoe effect pattern may be produced on an opaque member, for example, by drawing or photography and incorporated in a monoscope or similar picture signal generator tube.

In order that the invention may be more fully understood, reference will now be made to the accompanying drawing, in which.

Figures 1, 2:
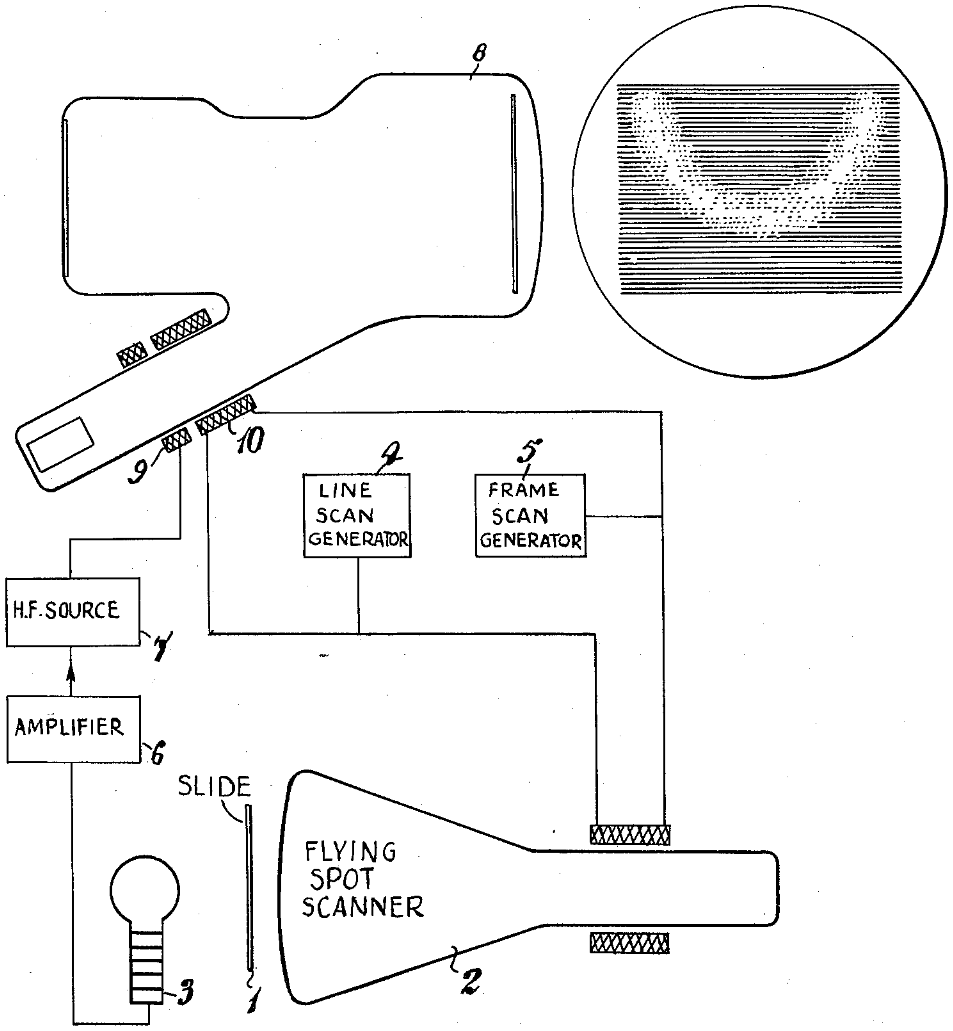
Figure 1 is a diagram of one arrangement according to the invention.
Figure 2 shows a horseshoe effect pattern.

In the arrangement of Figure 1, a copy of the horseshoe effect pattern shown in Figure 2, is formed on a slide 1 which is positioned in front of a flying-spot scanner 2, the light which passes through the slide falling upon a photoelectric cell 3 preferably a cell incorporating an electron multipler. The line and frame deflecting waveforms for the flying-spot scanner and the deflecting waveforms for the pick-up tube, are preferably derived from the same generators 4 and 5 so as to be in correct time relationship. The output voltage from the multiplier cell 3, varies according to the intensity of the light beam passing through the slide 1 and thus produces a voltage varying in accordance with the pattern of the horseshoe effect. In this way a modulation waveform is produced which can be used to compensate for the horseshoe effect of a particular tube. This modulation waveform is fed through an amplifier 6, and combined with the high frequency oscillations generated at 7, to produce a modulated high frequency signal which may be applied to modulate the electron beam of the pick-up tube 8 in any suitable manner. Advantageously, a separate coil 9 may be disposed on the neck of the pick-up tube, adjacent the line and frame deflector coils 10, the moduated high frequency being fed to this additional coil to modulate the electron beam in the frame direction.

The high frequency oscillations are preferably at least twice the highest modulation frequency component of the video signal, and for a high definition system may be of the order of 20 megacycles per second.

I claim:

1. Arrangement for reducing the effect of spurious signals such as the "horseshoe effect," in television pick-up tubes with high velocity scanning, comprising means for forming the electron beam of the pick-up tube into a spot on the target surface of the pick-up tube, which spot is small compared with the pitch of the scanning lines of the pick-up tube, means for producing high frequency oscillations at a frequency which is high in relation to the line frequency, means for producing a modulation waveform, means for applying said modulation waveform to vary the amplitude of the high frequency oscillations along the length of a line scan, and means for applying said high frequency oscillations to modulate the electron beam of said pick-up tube in a direction transverse to the line direction.

2. Arrangement for reducing the effect of spurious signals such as the "horseshoe effect," in television pick-up tubes with high velocity scanning, comprising means for forming the electron beam of the pick-up tube into a spot on the target surface of the pick-up tube, which spot is small compared with the pitch of the scanning lines of the pick-up tube, means for producing high frequency oscillations at a frequency which is high in relation to the line frequency, line and frame deflecting waveform generators, means for producing a modulation waveform from the line and frame deflecting waveform generators, means for applying said modulation to vary the amplitude of the high frequency oscillations along the length of a line scan and in successive lines of each frame and means for applying said high frequency oscillations to modulate the electron beam of said pick-up tube in a direction transverse to the line direction.

3. Arrangement for reducing the effect of spurious signals such as "horseshoe effect," in television pick-up tubes with high velocity scanning, comprising means for forming the electron beams of the pick-up tube into a spot on the target surface of the pick-up tube, which spot is small compared with the pitch of the scanning lines of the pick-up tube, means for producing high frequency oscillations at a frequency which is high in relation to the line frequency, means for producing a modulation waveform from a geometrical reproduction of the pattern of the "horseshoe effect" produced on the target electrode of the pick-up tube, means for applying said modulation to vary the amplitude of the high frequency oscillations along the length of a line scan, and means for applying said high frequency oscillations to modulate the electron beam of said pick-up tube in a direction transverse to the line direction.

4. Arrangement as claimed in claim 3 wherein the geometrical reproduction of the "horseshoe effect" pattern is produced on an opaque member incorporated in a picture signal generator tube.

5. Arrangement as claimed in claim 3, wherein the geometrical reproduction of the "horseshoe effect" pattern is produced on a slide positioned in front of a flying spot scanner, the light passing through the slide falling upon a photo-electric cell, the output voltage of which is combined with the source of high frequency oscillations before it is applied to the pick-up tube.

6. Arrangement for reducing the effect of spurious signals such as the "horseshoe effect" in television pick-up tubes with high velocity scanning, comprising means for producing a geometrical reproduction of the charge pattern producing the "horseshoe effect," means for generating high frequency oscillations, means for producing a modulation waveform according to the pattern of the "horseshoe effect" from said geometrical reproduction, means for feeding the modulation waveform to vary the amplitude of the high frequency oscillation and means for applying said modulated high frequency oscillations to said pick-up tube to oscillate the electron beam in said pick-up tube in a direction transverse to the line direction.

7. Arrangement for reducing the effect of spurious signals such as the "horseshoe effect" in television pick-up tubes with high velocity scanning, comprising means for producing a geometrical reproduction of the charge pattern producing the "horseshoe effect," means for generating line and frame deflection waveforms, means for deflecting the electron beam in said pick-up tube from said line and frame deflection waveforms, means for generating high frequency oscillation, a scanning beam controlled by said line and frame deflection waveforms scanning said geometrical reproduction of the "horseshoe effect" to produce a modulation waveform, means for feeding the modulation waveform to vary the amplitude of the high frequency oscillation generator and means for applying said modulated high frequency oscillations to said pick-up tube to oscillate the electron beam in said pick-up tube in a direction transverse to the line direction.

8. Arrangement for reducing the effect of spurious signals such as the "horseshoe effect" in television pick-up tubes with high velocity scanning, comprising means for producing a geometrical reproduction of the charge pattern producing the "horseshoe effect," means for generating line and frame deflection waveforms, means for deflecting the electron beam in said pick-up tube from said line and frame deflection waveforms, means for generating high frequency oscillation of at least twice the highest frequency modulation component of the video signal produced by the pick-up tube, a scanning beam controlled by said line and frame deflection waveforms scanning said geometrical reproduction of the "horseshoe effect" to produce a modulation waveform, means for feeding the modulation waveform to vary the amplitude of the high frequency oscillation generator and means for applying said modulated high frequency oscillations to a coil disposed on the neck of said pick-up tube to oscillate the electron beam in said pick-up tube in a direction transverse to the line direction.

9. Arrangement as claimed in claim 7, wherein the geometrical reproduction of the "horseshoe effect" pattern is produced on an opaque member incorporated in a picture signal generator tube.

10. Arrangement as claimed in claim 8, wherein the geometrical reproduction of the "horseshoe effect" pattern is produced on a slide positioned in front of a flying spot scanner, the light passing through the slide falling upon a photo-electric cell, the output voltage of which is combined with the source of high frequency oscillations before it is applied to the pick-up tube.

References Cited in the file of this patent

UNITED STATES PATENTS

| | | |
|---|---|---|
| 2,093,157 | Nakashima et al. | Sept. 14, 1937 |
| 2,269,226 | Rohats | Jan. 6, 1942 |
| 2,270,232 | Rosenthal | Jan. 20, 1942 |
| 2,339,833 | Bedford | Jan. 25, 1944 |
| 2,578,343 | Ekvall | Dec. 11, 1951 |
| 2,582,014 | De France et al. | Jan. 8, 1952 |